United States Patent
Korhonen et al.

(10) Patent No.: US 12,305,562 B2
(45) Date of Patent: May 20, 2025

(54) COMPACT EVAPORATION AND MIXING DEVICE

(71) Applicant: DINEX A/S, Middelfart (DK)

(72) Inventors: Toni Eero Mikael Korhonen, Middelfart (DK); Jim Elkjaer Bebe, Middelfart (DK); Mahipat Balwant Ranawat, Middelfart (DK); Rasmus Møller Mårtensson, Middelfart (DK)

(73) Assignee: DINEX A/S, Middelfart (DK)

( * ) Notice: Subject to any disclaimer, the term of this patent is extended or adjusted under 35 U.S.C. 154(b) by 0 days.

(21) Appl. No.: 18/552,469

(22) PCT Filed: Mar. 24, 2022

(86) PCT No.: PCT/EP2022/057753
§ 371 (c)(1),
(2) Date: Sep. 26, 2023

(87) PCT Pub. No.: WO2022/200494
PCT Pub. Date: Sep. 29, 2022

(65) Prior Publication Data
US 2024/0167412 A1    May 23, 2024

(30) Foreign Application Priority Data
Mar. 26, 2021 (EP) .................... 21165258

(51) Int. Cl.
*F01N 3/28* (2006.01)
*F01N 3/20* (2006.01)

(52) U.S. Cl.
CPC ......... *F01N 3/2892* (2013.01); *F01N 3/2066* (2013.01); *F01N 2240/20* (2013.01); *F01N 2610/02* (2013.01); *F01N 2610/1453* (2013.01)

(58) Field of Classification Search
CPC .. F01N 3/2066; F01N 3/2892; F01N 2240/20; F01N 2610/02
See application file for complete search history.

(56) References Cited

U.S. PATENT DOCUMENTS

2020/0347767 A1* 11/2020 El-Gammal ....... B01D 53/9431

FOREIGN PATENT DOCUMENTS

| CN | 108194178 A | * | 6/2018 | .......... F01N 3/2066 |
|---|---|---|---|---|
| CN | 108798852 A | | 11/2018 | |
| CN | 108194178 B | | 11/2019 | |
| CN | 111485980 A | | 8/2020 | |
| EP | 3760846 A1 | | 6/2021 | |

OTHER PUBLICATIONS

International Search Report issued Jun. 7, 2022, in corresponding International Application No. PCT/EP2022/057753, 3 pages.

* cited by examiner

*Primary Examiner* — Audrey B. Walter
(74) *Attorney, Agent, or Firm* — Maier & Maier, PLLC

(57) ABSTRACT

A liquid evaporation and gas mixing device for an exhaust gas after-treatment system. The device is for mixing an exhaust gas stream from the exhaust gas after-treatment system with an evaporated liquid reductant, and the device includes a housing that defines a longitudinal axis and having an upstream inlet receiving the exhaust gas stream and a downstream outlet distributing the mixed exhaust gas stream and evaporated reductant.

15 Claims, 6 Drawing Sheets

COMPACT EVAPORATION AND MIXING DEVICE

FIELD

The present invention relates to a relates to a liquid evaporation and gas mixing device for an exhaust gas after-treatment system, the device is for mixing an exhaust gas stream from the exhaust gas after-treatment system with an evaporated liquid reductant. Moreover, the present invention concerns an after-treatment system of the exhaust gases from a combustion engine wherein the device is incorporated. Furthermore, the present invention relates to a vehicle comprising the device of the present invention as well as the after-treatment system. The present invention also concerns use of the device of the present invention for mixing an exhaust gas stream from a combustion engine with an evaporated liquid reductant.

BACKGROUND

Achieving effective evaporation of aqueous urea solution coming from dosing modules, homogenous mixing of the resulting reductant products like ammonia into the exhaust gas, and thereafter homogenous distribution over the catalytic components is a known challenge in the field of exhaust gas after-treatment systems. Several inventions have been proposed to achieve this, while minimizing risk of urea deposits, minimizing backpressure and minimizing space requirement. Exhaust gas after-treatment systems comprising Selective Catalytic Reduction (SCR) systems may be included downstream of a combustion engine to remove or reduce nitrogen oxides (NOx) emissions coming from an engine. SCR systems include the introduction of a reductant to the exhaust gas stream. Mixers are added to help evaporate, decompose, and mix the reductant in the exhaust stream. Thorough mixing may help the performance by ensuring a homogeneous distribution of reductant, which enables the catalytic reactions to elapse uniformly across the cross section of the catalyst, thus minimizing ammonia slip and NOx emitted. US2010139258 relates to exhaust mixing systems, and more particularly to mixing systems for SCR systems. International patent application PCT/EP2019/061541 relates to a different mixing device involving a device for evaporating liquid spray and subsequent mixing into exhaust gases from a combustion engine comprising a housing which housing comprises a flow guiding device located within the housing.

SUMMARY

The present invention solves many of the problems with the prior art mixing systems for after-treatment systems, while differentiating itself from existing mixing systems. The result is a compact mixing system that meets the functionality requirements but is also simple to manufacture, can be employed with multiple different type of dosing modules, such as radial dosing, such as from each end of the first, second and/or third mixing chamber, with multiple dosing modules, and can be scaled for different catalyst diameters. The present invention concerns a new compact evaporation and gas mixing device which is directed at forming a part of the exhaust after-treatment system of a vehicle. It is intended in the after-treatment system that noxious exhaust gas out of vehicle engines passes through an oxidation catalyst, such as a Diesel Oxidation Catalyst (DOC) and/or a particulate filter, such as a Diesel Particulate Filter (DPF) and then into the compact exhaust gas mixing device of the present invention.

The mixing device of the invention allows a liquid reductant, such as aqueous urea solution, to evaporate and subsequently mixes the evaporated reductant with exhaust gas while minimizing space requirements in the direction of exhaust gas flow through an exhaust gas after-treatment system comprising the device of the invention. The device permits an exhaust gas after-treatment system comprising the device of the invention to spread an improved mixture of exhaust gas and reductant across the face of a Selective Catalytic reduction (SCR) catalyst or a SCR on filter catalyst for reduction of NOx to harmless nitrogen and water. In this respect, aqueous urea solution is injected under pressure into the mixing system via the reductant dosing module to form a liquid spray which is exposed to a rapidly moving exhaust gas stream in the device, thus enhancing evaporation.

In a first aspect the present invention to provide a liquid evaporation and gas mixing device for an exhaust gas after-treatment system, the device is for mixing an exhaust gas stream from the exhaust gas after-treatment system with an evaporated liquid reductant, the device comprising a housing that defines a longitudinal axis and having an upstream inlet receiving the exhaust gas stream and a downstream outlet distributing the mixed exhaust gas stream and evaporated reductant, and which comprises:
  a) a first mixing chamber adapted to swirl the exhaust gas stream inside the chamber and having at least one inlet for receiving the exhaust gas stream and at least one outlet,
  b) a second mixing chamber adapted to swirl the exhaust gas stream inside the chamber and having at least one inlet for receiving the exhaust gas stream and at least one outlet,
  c) a dosing module for spraying a liquid reductant into the first chamber or the second chamber or both first and second chamber for evaporation and mixing with the exhaust gas stream,
  d) a third mixing chamber in fluid tight communication with the at least one outlet of the first mixing chamber and in fluid tight communication with the at least one outlet of the second mixing chamber and having at least one outlet for distribution of the exhaust gas stream mixed with the evaporated reductant,
  e) a baffle located downstream from the upstream inlet and in fluid tight communication with the at least one outlet of the third mixing chamber, and optionally in fluid tight communication with the at least one inlet of the first and/or second mixing chamber and preventing the exhaust gas stream from the upstream inlet from bypassing the first, second and third mixing chambers.

In an embodiment the evaporated liquid reductant is an evaporated aqueous urea solution.

In a further embodiment in e) the baffle located is downstream from the upstream inlet and in fluid tight communication with the at least one outlet of the third mixing chamber and preventing the exhaust gas stream from the upstream inlet from bypassing the first, second and third mixing chambers.

In a still further embodiment in e) the baffle located is downstream from the first and second mixing chambers, in fluid tight communication with the at least one outlet of the third mixing chamber and preventing the exhaust gas stream from the upstream inlet from bypassing the first, second and third mixing chambers.

In a further embodiment a distribution unit is located downstream from the baffle and adapted for swirling the exhaust gas stream mixed with the evaporated reductant coming from the baffle, comprises at least one opening in the unit for communication with the outlet for distributing the mixed exhaust gas stream and evaporated reductant. Typically, the distribution unit comprises a swirling baffle and a flow deflecting device for deflecting and swirling the exhaust gas stream mixed with the evaporated reductant coming from the baffle. In a further embodiment the swirling baffle and baffle comprises a redirecting zone for redirecting the exhaust gas stream mixed with the evaporated reductant coming from the deflecting device to the outlet for distributing the mixed exhaust gas stream and evaporated reductant.

In a still further embodiment, the swirling baffle comprises a plurality of openings arranged along its perimeter.

In a further embodiment, the flow deflecting device is arranged to deflect the flow of the exhaust gas stream in a generally backward direction.

In a still further embodiment, the flow deflecting device comprises a conical bulge in its centre.

In a further embodiment, the first and second mixing chambers have identical construction.

The first and second mixing chambers are constructed to guide the exhaust gas stream into the third mixing chamber for instance as shown in FIGS. 1-6. In a preferred embodiment the first and second mixing chambers are located on each side of the third mixing chamber and the first, second and third mixing chamber defines a longitudinal axis which is substantially perpendicular to the longitudinal axis of the housing.

In a still further embodiment, the first and second mixing chambers comprises a cylindrical tube with multiple openings and swirling means, located on the outer periphery of the chambers. In one example, the swirling means is a spiral element.

In another embodiment, the first and second mixing chambers comprises a spiral shaped tube with multiple openings adapted to induce swirling of the exhaust gas stream.

In a still other embodiment, the first and second mixing chambers comprises a cylindrical tube with multiple openings and swirl enhancing vanes.

When the distribution unit comprises a swirling baffle, the swirling baffle is fixed to the flow deflecting device and adapted for inducing swirling along the longitudinal axis of the housing.

In a further embodiment the device of the present invention is consisting of one first mixing chamber, one second mixing chamber, one third mixing chamber, one dosing module and one baffle.

In a still further embodiment, the third mixing chamber is located between the first and second mixing chambers defining a longitudinal axis perpendicular to the longitudinal axis of the housing.

In a further embodiment the third mixing chamber is adapted to expel the exhaust gas stream mixed with the evaporated reductant along the longitudinal axis of the housing.

In a still further embodiment, the first mixing chamber is adapted to swirl the exhaust gas stream clockwise inside the first mixing chamber and the second mixing chamber is adapted to swirl the exhaust gas stream counterclockwise inside the second mixing chamber.

In a further embodiment the first mixing chamber is adapted to swirl the exhaust gas stream counterclockwise inside the first mixing chamber and the second mixing chamber is adapted to swirl the exhaust gas stream clockwise inside the second mixing chamber.

In a further embodiment the device of the present invention comprises swirling baffle located at the redirecting zone and fixed to the flow deflecting device, in particular, to the exterior of the flow deflecting device. Typically, the swirling baffle further comprise openings and/or swirling vanes. Preferably, the swirling baffle is also fixed to the baffle.

In a further embodiment the device of the present invention comprises one dosing module for spraying the liquid reductant into the first chamber.

In a still further embodiment, the device of the present invention comprises one dosing module for spraying the liquid reductant into the second chamber.

In a further embodiment the device of the present invention comprises one dosing module for spraying the liquid reductant into the first chamber and one dosing module for spraying the liquid reductant into the second chamber. Typically, the dosing module is a pressure atomizer. Alternatively, the dosing module is an air-assisted atomizer. The dosing module can be both actively heated or without heating.

In another embodiment the dosing module is arranged in a radial manner relative to the longitudinal axis of the housing.

In a further embodiment the third mixing chamber is designed in such a way that the outlet does not choke the flow coming from the first and second mixing chamber.

In a still further embodiment, the device of the present invention comprises at least one additional dosing module. Typically, 2 or more dosing modules may be present.

In a second aspect the present invention relates to an after-treatment system of the exhaust gases from a combustion engine characterised in that it comprises at least one device of the present invention as well as any one of the above embodiments.

In an embodiment of the second aspect the after-treatment system further comprises a particulate filter. Typically, a DPF.

In a further embodiment of the second aspect the after-treatment system further comprises a SCR catalyst. Typically, the SCR catalyst is on filter.

In a still further embodiment of the second aspect the after-treatment system further comprises an Oxidation Catalyst, such as a DOC.

In a further embodiment of the second aspect the after-treatment system further comprises an Ammonia Slip Catalyst.

In a still further embodiment of the second aspect the after-treatment system is arranged in a linear manner. Alternatively, the after-treatment system is arranged in a switchback manner.

In a third aspect the present invention relates to use of at least one device of the present invention as well as any one of the above embodiments for mixing an exhaust gas stream from a combustion engine with an evaporated liquid reductant.

In an embodiment the combustion engine is a Diesel engine.

In another embodiment the combustion engine is an Otto engine.

In a further embodiment the combustion engine is an Atkinson engine.

In a fourth aspect the present invention relates to a vehicle characterised in that it comprises an after-treatment system of the present invention as well as any one of the above embodiments.

In an embodiment the vehicle is powered by a Diesel engine.

In another embodiment the vehicle is powered by an Otto engine.

In a further embodiment the vehicle is powered by an Atkinson engine.

In a further aspect the present invention relates to use of at least one device of the present invention as well as any one of the above embodiments in connection with construction of an after-treatment system for exhaust gas.

Further objects and advantages of the present invention will appear from the following description, and claims.

DESCRIPTION

There are many advantages of the present invention in a broad context as well as further even more advantages aspects of the embodiments.

Achieving effective evaporation of a liquid reductant, such as aqueous urea solution, coming from dosing modules, homogenous mixing of the resulting reductant products like ammonia into the exhaust gas, and thereafter homogenous distribution over the catalytic components is a known problem in the field of the invention. Several of the prior art devices have been proposed to achieve this, while minimizing risk of urea deposits, minimizing backpressure and minimizing space requirement.

The present invention provides improvements over the prior art, while differentiating itself from existing devices, by the construction herein detailed. The result is a compact mixing system that meets desired functionality requirements, but is also simple to manufacture, can be employed with multiple different dosing modules, with both axial and radial dosing, with multiple dosing modules, and can be scaled for different catalyst diameters. When present, the swirling baffle on the flow deflecting device address low pressure zone behind it. The swirling baffle transfers heat from exhaust gas to flow deflecting device minimizing deposit issues. Injection can happen axially and radially (radial shown in figures). This injection allows for multiple different dosing units with different droplet sizes. For air-assisted dosing system, an extra device may be added on the nozzle, such as a dosing module injection protection attachment.

The term "a liquid reductant" as used herein refers to a liquid suitable for forming a reductant reducing the noxious gases, such as a DEF (Diesel Exhaust Fluid), and an aqueous urea solution.

The term "a longitudinal axis" as used herein refers to a fictive axis inside the housing defining the orientation of the housing for exhaust gas flow and location of flow guiding device and flow deflecting device.

Figure 4:
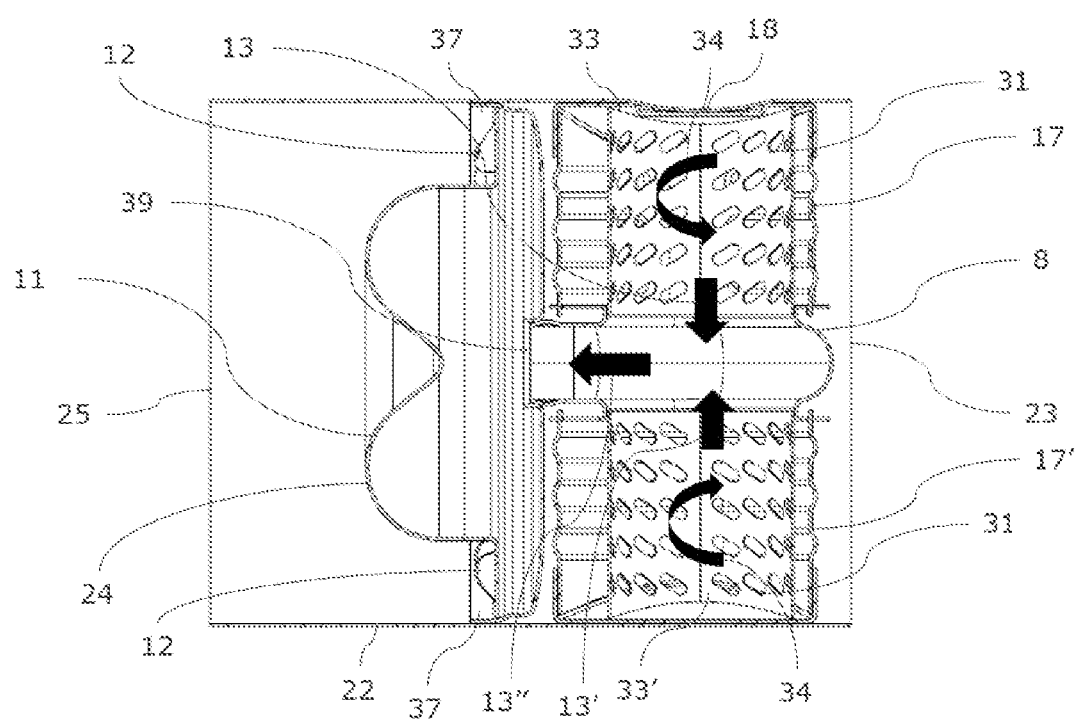
FIG. 4 illustrates an embodiment of the mixing device of the present invention as a cross sectional view.

The term "a redirecting zone" as used herein in relation to redirecting the flow coming from the deflecting device to the outlet refers to the zone created by the wall of the housing, the flow guiding device and the flow deflection device, which is also illustrated in FIG. 4 as reference number (24).

The term "an opening" as used herein refers to openings of any dimension as long as they are sufficiently large to aid flow through of exhaust gas streams, such as circular, polygonal, or other openings.

Figure 1:
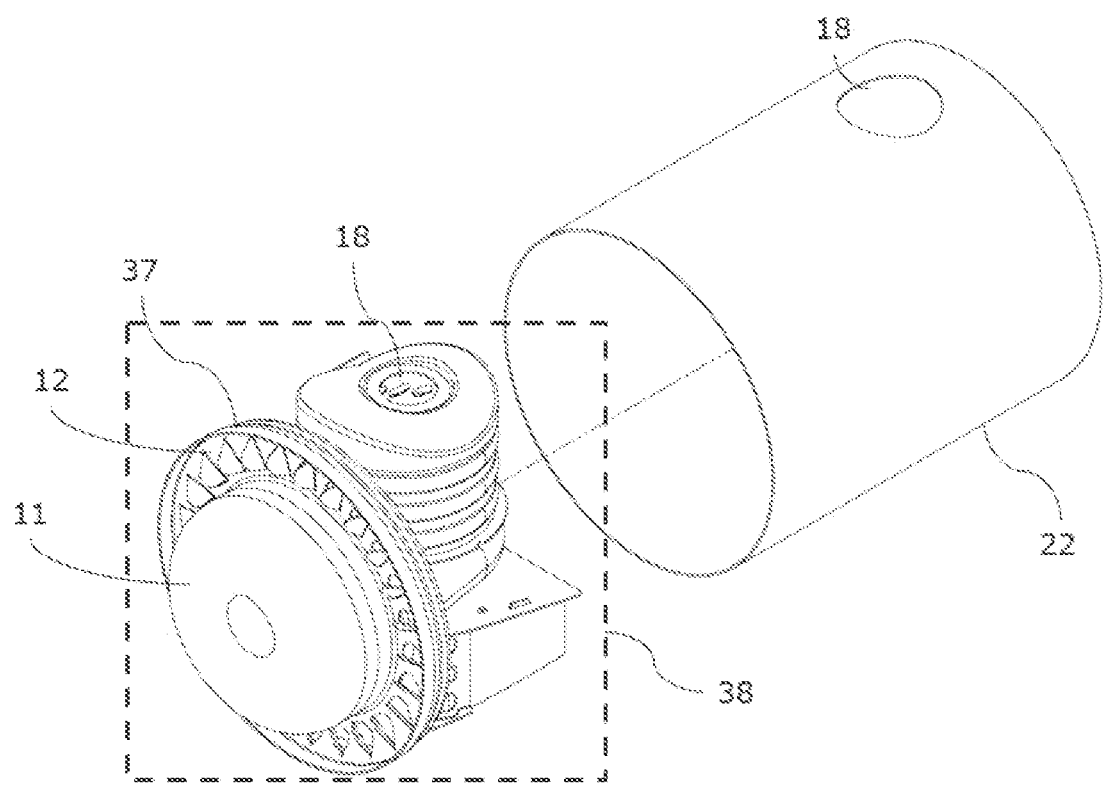
FIG. 1 is an exploded view of the housing and parts inside the housing of an embodiment of the device of the present invention.

The term "swirling baffle" as used herein refers to a wall with an opening having a swirling vane for creating swirling of the gases. The typical form of such swirling baffles are annular rings, and one embodiment is shown in FIG. 1.

The method and device according to the present invention will now be described in more detail with regard to the accompanying FIGS. 1-6. The figures show one way of implementing the present invention and is not to be construed as being limiting the present invention in any way.

First and second mixing chamber (10, 10') as shown in FIGS. 1-5 can be produced by rolling the outer spirals (17, 17') and inner tubes (33, 33') can be produced by laser cutting and rolling, the caps (14, 14') can be produced by deep drawing and the bottoms (15, 15') can be laser cut. Finally, the components can be joined together using welding, brazing, or any other secure attachment method known to one skilled in the art.

Third mixing chamber (8) can be produced in two parts using deep drawing or any other metal forming method known to one skilled in the art. Subsequently the two parts can be joined together using welding, brazing, or any other secure attachment method known to one skilled in the art.

Baffle (37) can be produced by deep drawing or any other metal forming method known to one skilled in the art.

The swirling baffle (12) can be produced in one piece using pressing and punching operation. Swirling baffle (12) is secured to flow deflecting device (11) and the housing (22) using welding, brazing, or any other secure attachment method known to one skilled in the art.

Housing (22) can be produced by rolling sheet metal, welding or brazing the seam and form the ends.

Material to be used can be stainless steel that has low thermal expansion, urea corrosion resistant and having good formability and weldability.

FIG. 1 is an exploded view of the liquid evaporation and gas mixing device of the present invention illustrating the evaporation and mixing device with distribution unit (38) pulled out of the housing (22). The distribution unit is constructed from a flow deflecting device (11) and a swirling baffle (12) (such as e.g. disclosed in International patent application PCT/EP2019/061541, which is hereby incorporated in its entirety by reference). The evaporation and mixing device with distribution unit (38) is in one embodiment assembled inside the housing by welding along the perimeter of the baffle (37) and around the reductant dosing inlet (18).

Figure 2:
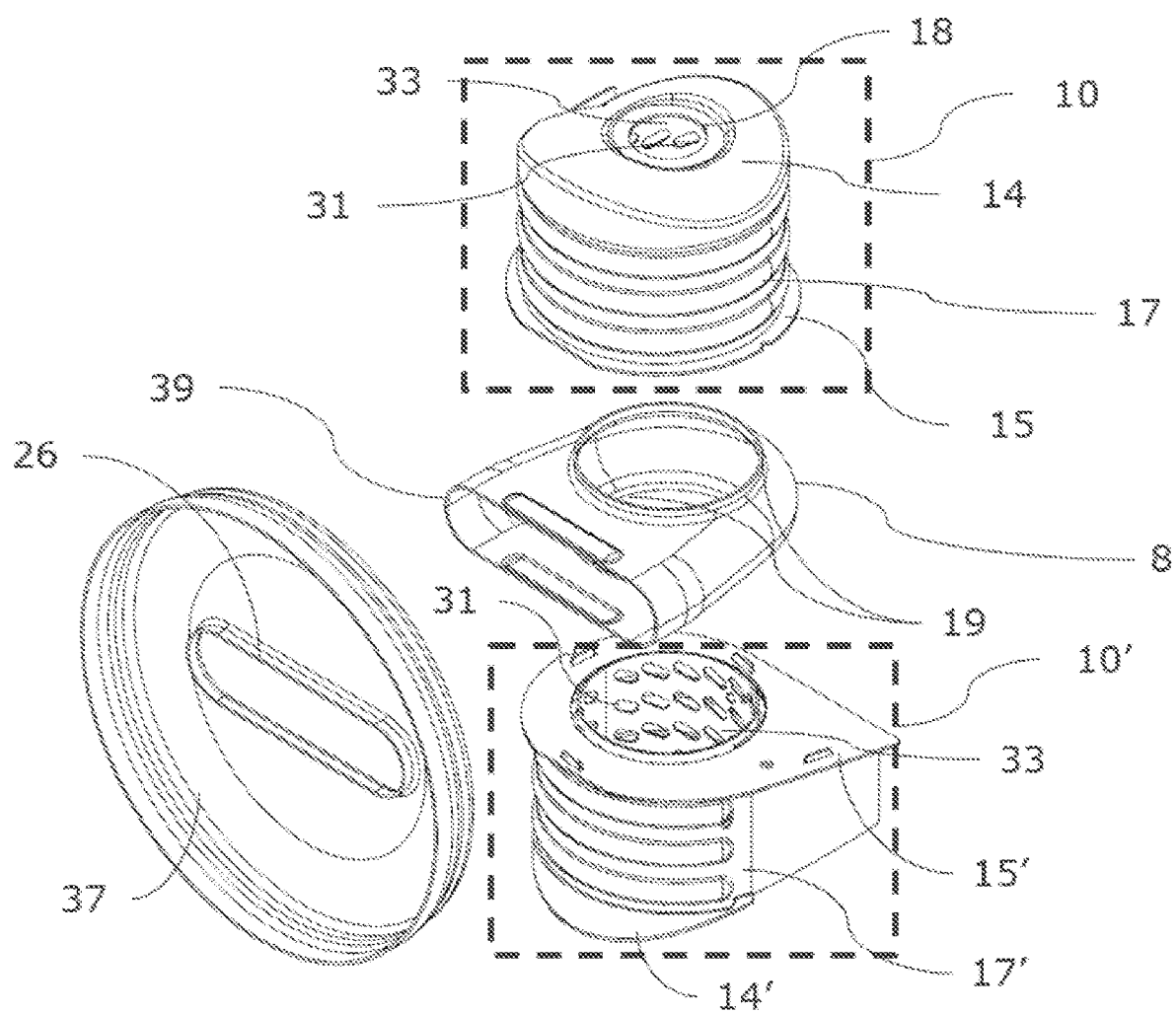
FIG. 2 is an exploded view of the mixing device of the present invention.

FIG. 2 is an exploded view illustrating individual components and subassemblies of an exemplary liquid evaporation and gas mixing device of the invention. In an embodiment, the first mixing chamber (10) comprises a bottom (15), a cap (14) having a reductant dosing inlet (18), an outer spiral (17) and an inner tube (33), the inner tube having apertures (31) through which an exhaust gas stream can enter. In the embodiment, the second mixing chamber (10') comprises a bottom (15'), a cap (14'), an outer spiral (17') and an inner tube (33'), the inner tube having apertures (31')

through which an exhaust gas stream can enter. The third mixing chamber (8) comprises two inlets (19) on opposite sides, the inlets (19) form a fluid tight connection to the first mixing chamber (10) and the second mixing chamber (10'). The third mixing chamber further comprises an outlet (39) which forms a fluid tight connection with an opening (26) of a baffle (37).

Figure 3:
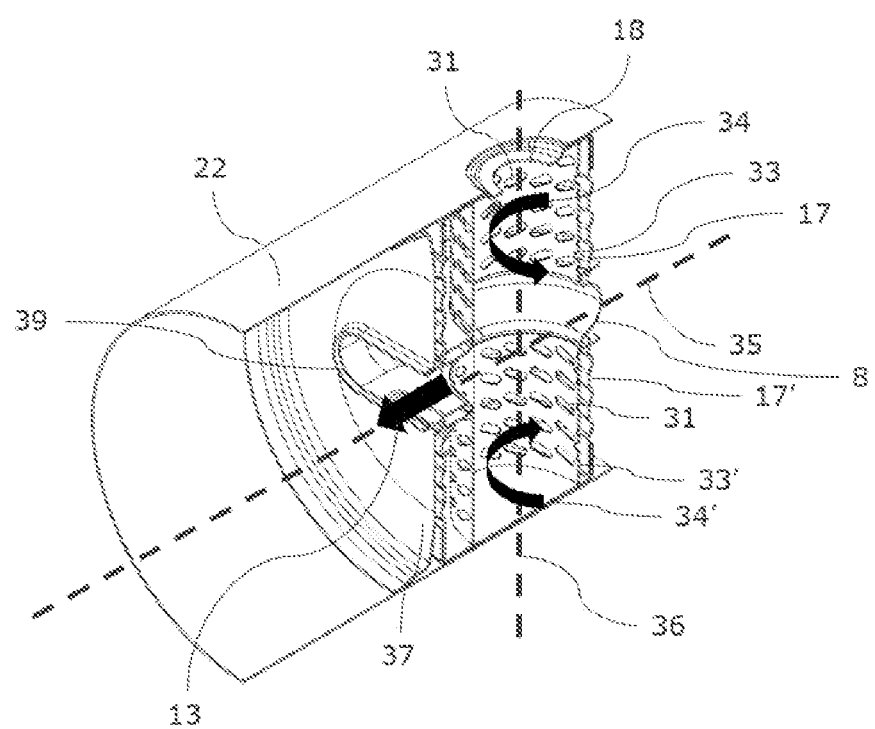
FIG. 3 illustrates an embodiment of the mixing device of the present invention as a cross sectional 3D like view.

FIG. 3 illustrates a liquid evaporation and gas mixing device of the present invention seen as a 3D like cross section. The gas mixing device of the embodiment comprises a housing (22) which is cylindrical and defines a longitudinal axis (35). In the housing (22) a reductant dosing inlet (18) provides an orifice through which a liquid reductant, such as an aqueous urea solution, can be sprayed into the exhaust gases when the after-treatment system is in operation in a vehicle, such as a diesel truck or the like. The internals of the gas mixing device of the embodiment comprise an inner tube (33) having swirling device apertures (31), enveloped by an outer spiral (17) where the outer spiral induces in the embodiment a counterclockwise swirling gas stream (34) inside the inner tube (33). Liquid reductant is sprayed into the inner pipe (33) where it evaporates and mixes in the gas stream. The mixing device further comprises another inner tube (33') having swirling device apertures (31), enveloped by an outer spiral (17') where the outer spiral (17') induces, in the embodiment, a clockwise swirling gas stream (34') inside the inner tube (33'). The opposing swirling gas streams revolve around the longitudinal axis of the evaporation and mixing device (35) defined by the inner pipes (33, 33'). The swirling gasses join in the third mixing chamber (8) where the exhaust gas and evaporated liquid reductant is further mixed, whereupon the gasses are subsequently expelled through the third mixing chamber outlet (39) to the downstream side of the baffle (37), the gas stream direction (13) generally following along the housing longitudinal axis (35).

FIG. 4 is a cross sectional view of the liquid evaporation and gas mixing device of the present invention as shown in FIG. 1 comprising a distribution unit. The exhaust gases, when the after-treatment system is in operation with the engine running, will enter the inlet (23) of the housing (22) of the mixing device and flow into one of the two outer spirals (17, 17') enveloping the two inner tubes (33, 33') through the apertures (31). Liquid reductant will be sprayed into the exhaust gas stream through the reductant dosing inlet (18), the liquid reductant such as aqueous urea will be evaporated by the rapidly moving swirling exhaust gas stream (34) in the inner tube (33) while the swirling exhaust gas stream (34') in the inner tube (33') will provide an opposing push aiding in keeping the liquid from reaching the end of inner tube (33') in proximity to the housing (22). The gas stream (13, 13') from the two inner tubes (33, 33') join in the third mixing chamber (8) and subsequently flow through the third mixing chamber outlet (39) to the downstream side of the baffle (37). The baffle (37) effectively seals the outlet (25) from the inlet (23) such that all the flow must pass through the evaporation and mixing device and the distribution unit. The flow (13") coming through the third mixing chamber outlet (39) is transported via the deflecting device (11) to the swirling baffle (12). The deflecting device (11) and the swirling baffle (12) are joined together inside the baffle (37). The flow is then transported towards the outlet (25) through the openings in the swirling baffle (12). The outlet (25) will be connected to a SCR (not shown).

Figure 5:
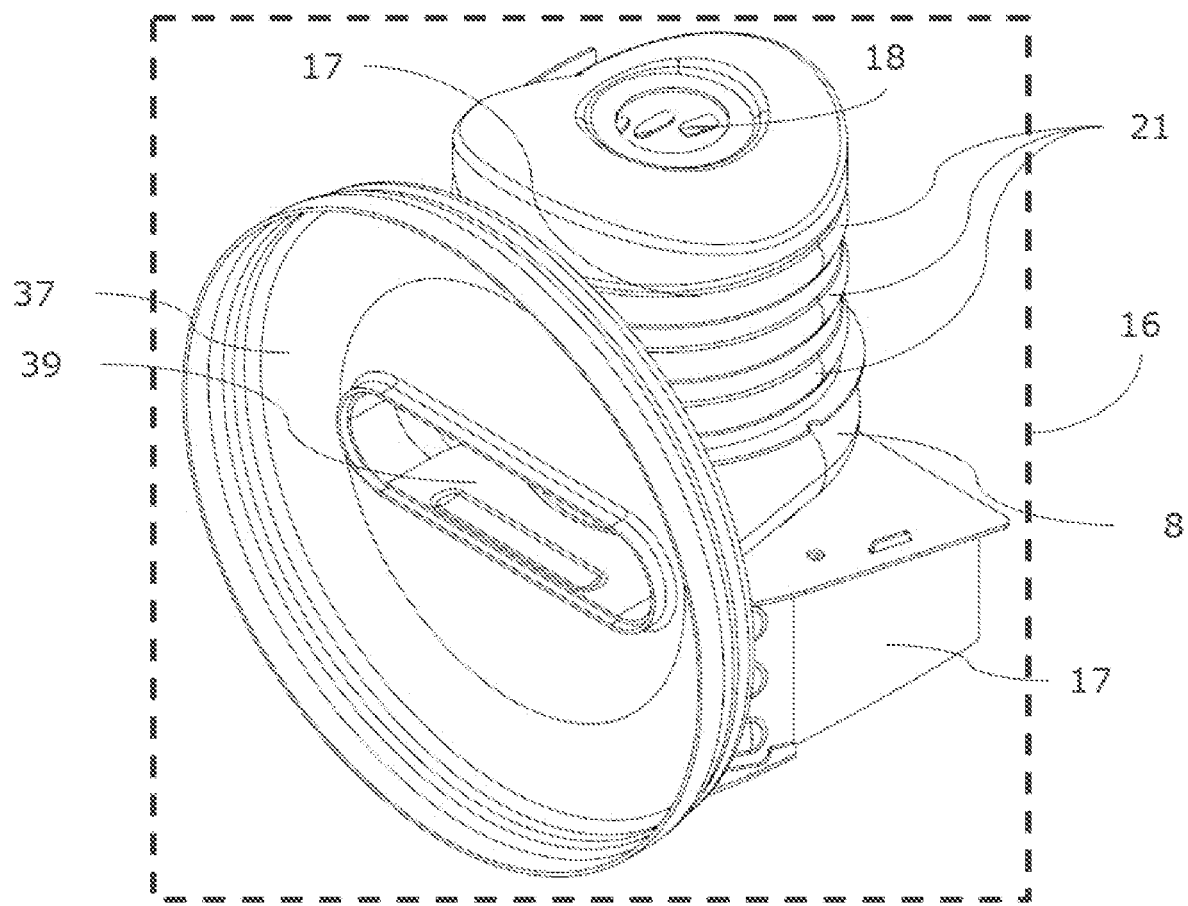
FIG. 5 illustrates a 3D like view of the mixing device of the present invention.

FIG. 5 illustrates, in an embodiment, the liquid evaporation and gas mixing device (16) having two outer spirals (17, 17'), the outer spirals having spiral indentations (21). The spiral indentations serve two purposes, the stiffen the structure and to provide a guiding means for the flow, such that the flow inside the spiral is planar relative to the axis defined by the spiral. Also shown is the reductant dosing inlet (18), sitting on the axis defined by the outer spiral (17, 17'). The third mixing chamber is sitting in between the outer spirals (17, 17') having a fluid tight connection to the baffle (37), around the outlet of the third mixing chamber (39).

Figure 6:
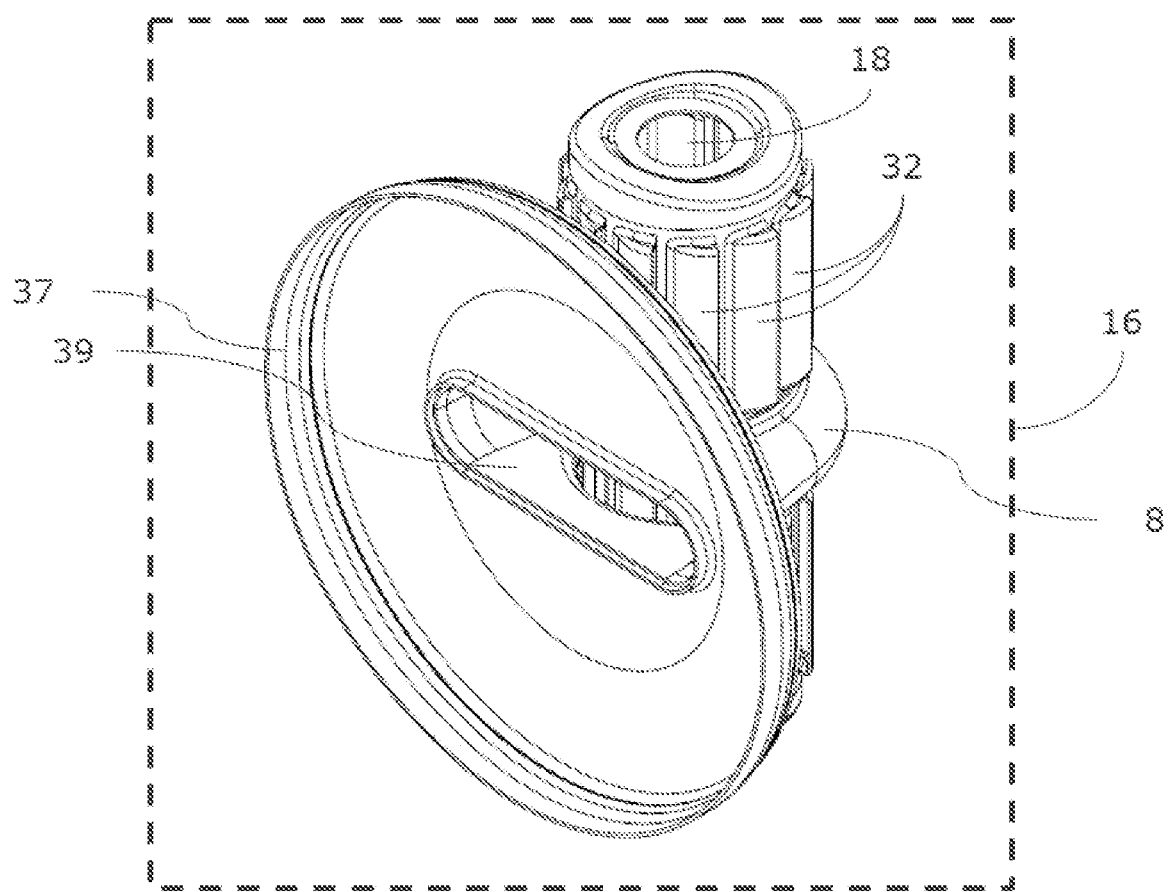
FIG. 6 illustrates a 3D like view of an alternative embodiment of the mixing device of the present invention.

FIG. 6 illustrates the liquid evaporation and gas mixing device (16) in a second embodiment where the first mixing chamber and second mixing chamber of FIG. 2 are replaced by tubes having gills (32). The gills (32) allow the flow to enter the tubes and achieve the same gas swirl around the spray liquid reductant. The tubes form a gas tight connection to the third mixing chamber (8) through which the gas is expelled to the downstream side of the baffle (37).

The liquid evaporation and gas mixing device of the present invention may be made by various production methods, and herein below is one way of making an embodiment of the device described in more detail with reference to the FIGS. 1-5. The first and second mixing chamber may each be in four parts wherein the pipe part (33, 33') is laser cut and rolled, the outer spiral (17, 17') is laser cut and rolled, the cap (14, 14') is pressed and the bottom (15, 15') is laser cut. the inner pipe (31, 31') is welded on the bottom (15, 15') to form a first assembly and the cap (14, 14') is welded to the formed outer spiral (17, 17') to form a second assembly subsequently the first and second assembly are joined by welding the spiral 17, 17') to the bottom (15, 15'). The third mixing chamber (8) can be produced in two parts using deep drawing and joined together with a weld. The first, second and third mixing chambers (10, 10', 8) are joined together with a weld. The baffle (37) is pressed, and the outlet of the third mixing chamber (39) is fitted through the baffle opening (26) subsequently the outlet and the baffle opening are joined with a weld. The swirling baffle (12) are laser cut and pressed and deflecting device (11) is deep drawn. The swirling baffle (12) and deflecting device (11) are assembled by welding to the baffle (37) around the perimeter of the swirling baffle (12). The final assembly comprises the first, second and third mixing chambers (10, 10', 8), the baffle (37), the swirling baffle (12) and the flow deflector (11) being pushed into the housing (22) and welded through openings in the housing as well as inside the housing.

All references, including publications, patent applications and patents, cited herein are hereby incorporated by reference to the same extent as if each reference was individually and specifically indicated to be incorporated by reference and was set forth in its entirety herein.

All headings and sub-headings are used herein for convenience only and should not be construed as limiting the invention in any way.

Any combination of the above-described elements in all possible variations thereof is encompassed by the invention unless otherwise indicated herein or otherwise clearly contradicted by context.

Recitation of ranges of values herein are merely intended to serve as a short method of referring individually to each separate value falling within the range, unless otherwise indicated herein, and each separate value is incorporated into the specification as if it were individually recited herein. Unless otherwise stated, all exact values provided herein are representative of corresponding approximate values (e.g., all exact exemplary values provided with respect to a particular factor or measurement can be considered to also provide a corresponding approximate measurement, modified by "about", where appropriate).

All methods described herein can be performed in any suitable order unless otherwise indicated herein or otherwise clearly contradicted by context.

The terms "a" and "an" and "the" and similar referents as used in the context of describing the invention are to be construed to insert both the singular and the plural, unless otherwise indicated herein or clearly contradicted by context. Thus, "a" and "an" and "the" may mean at least one, or one or more.

The term "and/or" as used herein is intended to mean both alternatives as well as each of the alternatives individually. For instance, expression "xxx and/or yyy" means "the xxx and yyy; the xxx; or the yyy", all three alternatives are subject to individual embodiments.

The use of any and all examples, or exemplary language (e.g., "such as") provided herein, is intended merely to better illuminate the invention and does not pose a limitation on the scope of the invention unless otherwise indicated. No language in the specification should be construed as indicating any element is essential to the practice of the invention unless as much is explicitly stated.

The citation and incorporation of patent documents herein is done for convenience only and does not reflect any view of the validity, patentability and/or enforceability of such patent documents.

The description herein of any aspect or embodiment of the invention using terms such as "comprising", "having", "including" or "containing" with reference to an element or elements is intended to provide support for a similar aspect or embodiment of the invention that "consists of", "consists essentially of", or "substantially comprises" that particular element or elements, unless otherwise stated or clearly contradicted by context (e.g., a composition described herein as comprising a particular element should be understood as also describing a composition consisting of that element, unless otherwise stated or clearly contradicted by context).

This invention includes all modifications and equivalents of the subject matter recited in the aspects or claims presented herein to the maximum extent permitted by applicable law.

The features disclosed in the foregoing description may, both separately and in any combination thereof, be material for realizing the invention in diverse forms thereof.

We claim:

1. A liquid evaporation and gas mixing device for an exhaust gas after-treatment system, the device is for mixing an exhaust gas stream from the exhaust gas after-treatment system with an evaporated liquid reductant, the device comprising a housing that defines a longitudinal axis and having an upstream inlet receiving the exhaust gas stream and a downstream outlet distributing the mixed exhaust gas stream and evaporated reductant, and which comprises:
    a) a first mixing chamber adapted to swirl the exhaust gas stream inside the chamber and having at least one inlet for receiving the exhaust gas stream and at least one outlet, wherein
    the first mixing chamber defines a longitudinal axis,
    b) a second mixing chamber adapted to swirl the exhaust gas stream inside the chamber and having at least one inlet for receiving the exhaust gas stream and at least one outlet,
    wherein the second mixing chamber defines a longitudinal axis,
    c) a dosing module for spraying a liquid reductant into the first chamber or the second chamber or both first and second chamber for evaporation and mixing with the exhaust gas stream,
    d) a third mixing chamber in fluid tight communication with the at least one outlet of the first mixing chamber and in fluid tight communication with the at least one outlet of the second mixing chamber and having at least one outlet for distribution of the exhaust gas stream mixed with the evaporated reductant, wherein at least one outlet for distribution of the exhaust gas stream mixed with the evaporated reductant of the third mixing chamber is essentially perpendicular to the longitudinal axis of the first mixing chamber and essentially perpendicular to the longitudinal axis of the second mixing chamber,
    e) a baffle located downstream from the upstream inlet and in fluid tight communication with the at least one outlet of the third mixing chamber,
    wherein the third mixing chamber is located between the first and second mixing chambers defining a longitudinal axis perpendicular to the longitudinal axis of the housing and wherein the third mixing chamber expels the exhaust gas stream mixed with the evaporated reductant along the longitudinal axis of the housing.

2. The device of claim 1 wherein the liquid reductant is an aqueous urea solution.

3. The device of claim 1 wherein the first mixing chamber is adapted to swirl the exhaust gas stream clockwise inside the first mixing chamber and the second mixing chamber is adapted to swirl the exhaust gas stream counter clockwise inside the second mixing chamber or wherein the first mixing chamber is adapted to swirl the exhaust gas stream counter clockwise inside the first mixing chamber and the second mixing chamber is adapted to swirl the exhaust gas stream clockwise inside the second mixing chamber.

4. The device according to claim 1 consisting of one first mixing chamber, one second mixing chamber, one third mixing chamber, one dosing module and one baffle.

5. The device according to claim 1 wherein the baffle is in fluid tight communication with the at least one inlet of the first and/or second mixing chamber and prevents the exhaust gas stream from the upstream inlet from bypassing the first, second and third mixing chambers.

6. The device of claim 1 wherein a distribution unit is located downstream from the baffle and is adapted for swirling the exhaust gas stream mixed with the evaporated reductant coming from the baffle, comprises at least one opening in the distribution unit for communication with the outlet for distributing the mixed exhaust gas stream and evaporated reductant.

7. The device of claim 6 wherein the distribution unit comprises a swirling baffle and a flow deflecting device for deflecting and swirling the exhaust gas stream mixed with the evaporated reductant coming from the baffle.

8. The device according to claim 7 wherein the swirling baffle and baffle comprise a redirecting zone for redirecting the exhaust gas stream mixed with the evaporated reductant coming from the deflecting device to the outlet for distributing the mixed exhaust gas stream and evaporated reductant.

9. The device according to claim 7 wherein the swirling baffle comprises a plurality of openings arranged along its perimeter.

10. The device according to claim 7 wherein the flow deflecting device is arranged to deflect the flow in a generally backward direction.

11. The device of claim 7 wherein the swirling baffle is fixed to the flow deflecting device and adapted for inducing swirling along the longitudinal axis of the housing.

12. The device according to claim 7 wherein the flow deflecting device comprises a conical bulge in its centre.

13. The device of claim 12 wherein the first and second mixing chambers comprise a cylindrical tube with multiple openings and a swirling means, located on an outer periphery of the chambers.

14. The device of claim 12 wherein the first and second mixing chambers comprise a spiral shaped tube with multiple openings adapted to induce swirling of the exhaust gas stream.

15. The device of claim 12 wherein the first and second mixing chambers comprise a cylindrical tube with multiple openings comprising swirl enhancing vanes.

* * * * *